TONE OPERATED ECHO SUPPRESSOR CONTROL CIRCUIT

Filed Sept. 29, 1960 2 Sheets-Sheet 1

INVENTOR
T. F. BENEWICZ
BY [signature]
ATTORNEY

Feb. 23, 1965 T. F. BENEWICZ 3,170,994

TONE OPERATED ECHO SUPPRESSOR CONTROL CIRCUIT

Filed Sept. 29, 1960 2 Sheets-Sheet 2

INVENTOR
T. F. BENEWICZ
BY E. J. Olinder
ATTORNEY

United States Patent Office 3,170,994
Patented Feb. 23, 1965

3,170,994

TONE OPERATED ECHO SUPPRESSOR CONTROL CIRCUIT

Thomas F. Benewicz, East Paterson, N.J., assignor to Bell Telephone Laboratories, Incorporated, New York, N.Y., a corporation of New York Filed Sept. 29, 1960, Ser. No. 59,272
10 Claims. (Cl. 179—170.2)

This invention relates to two-way signal transmission systems and more particularly to signal-operated switching circuits which are employed in such systems to reduce interference caused by noise and echoes. The principal object of the invention is to increase the effectiveness of such circuits.

Switching circuits of the type referred to, commonly called echo suppressors, conventionally operate on a level-differential principle. In a two-way voice system, for example, the typical function of an echo suppressor is to compare the level of signals traveling in opposite directions and, in the event of a sufficient difference between the two, to assign precedence to the stronger signal by the insertion of loss in the path of the weaker signal. If the difference in level between signals from opposite ends of the system is less than some preassigned magnitude, the echo suppressor remains inoperative and simultaneous transmission in both directions is permitted.

In voice communication systems it is generally desirable to permit a strong signal to break in on a weak signal in order to preserve the natural interchange aspect of conversation. To provide for break-in, conventional echo suppressors generally keep the talking paths operative in both directions even through a relatively high loss may be inserted in one of the paths to give precedence to the other talker. Consequently, echo interference is not completely eliminated but, instead, is reduced to some level which is considered to be acceptable to the network subscribers. An echo suppressor of the type which includes the conventional features described is shown in Patent 2,257,806, issued to D. Mitchell, October 7, 1941.

The relatively low-level, intermittent echo and noise interference that may be tolerated in a voice communication system is often unacceptable in other systems which include, for example, those designed for the transmission of data, facsimile, and telephoto signals. Maximum protection against echoes and noise must be provided in such systems to ensure proper transmission quality. Moreover, after directional priority has been given to the signals which comprise a particular message, which may be a complete telephoto, for example, break-in by echoes, by noise or by valid signals from the opposite end of the link must be avoided to preserve message continuity. Additionally, echo suppressors in such systems must be immune to the presence of stray voice signals, such as those induced by crosstalk effects, and must be responsive instead to carrier signals which fall within prescribed limits of frequency and amplitude.

Accordingly, a specific object of the invention is to reduce the interference created by noise and echoes in two-way communication systems.

A further object is to reduce the likelihood of false operation of an echo suppressor by echoes and noise.

An additional object is to afford a high degree of protection to facsimile, data and telephoto systems against noise and echoes without resort to complex circuitry.

These and other objects are achieved in accordance with the invention by an echo suppressor that operates on a differential basis both in time and in level and that functions, when in the operated condition, as a non-differential circuit. Specifically, each side of a bilateral communication system is provided with a respective branch which diverts a part of the power of incoming signals to a corresponding one of two like echo suppressor networks. Each of the two networks includes a respective pair of parallel circuits. One of the circuits in each of the networks includes switching apparatus, such as a relay, for example, which is responsive after a first preassigned time delay to signals which exceed a first preselected threshold. The other of the two circuits in each of the echo suppressor networks includes switching apparatus which is responsive, after a second preassigned time delay, to signals exceeding a second preassigned threshold. The first time delay exceeds the second time delay and the second threshold exceeds the first threshold. The operation of either of the switching means in either of the two echo-suppressor networks disables the opposite side of the line and also the opposite echo-suppressor network. The disabled side of the line remains in the disabled condition so long as a valid signal of sufficient level persists on the operative side of the line, irrespective of the magnitude of signals, echoes, or noise on the disabled side. In short, no interference with a signal is permitted once preference has been assigned to it by the dual-differential operation of the suppressor.

In accordance with a particular aspect of the invention, the two preselected thresholds referred to above, and the average level of the strongest signals which are likely to be employed in the system, are uniquely interrelated. Specifically, the higher of the two thresholds is selected to lie midway between the lower threshold and the average level of the strongest signals. In effect, the higher threshold divides the normal signal amplitude range of the echo suppressor into two adjacent equal portions, namely, a high range and a low range.

Additionally, in accordance with this aspect of the invention, the common magnitude of the high and low signal ranges is selected to be less than the return-loss of the system, return-loss being measured by the difference in magnitude at a particular point in the system between a signal and its echo. Consequently, the magnitude of an echo which results from a signal in the high range is necessarily reduced to the low range by the return-loss. A time precedence is automatically assigned to the signal by the dual, level-differential action described and the echo side of the transmission system is disabled. Similarly, the magnitude of an echo which results from a signal in the low range is reduced below the level of the first threshold, that is, below the maximum sensitivity level of the echo suppressor, and hence, despite the fact that the signal receives the lower, or the slower, of the two possible timing precedences, the echo suppressor is again responsive only to the valid signal.

Accordingly, one feature of the invention is a means for applying a combination dual-time and level-differential principle of operation to an echo suppressor.

Another feature of the invention is a means for operating an echo suppressor in a dual time and level-differential mode for the purpose of assigning precedence to one of two signals and for operating in a non-differential mode after precedence has been assigned.

A further feature is a means for establishing a preassigned relation among a plurality of signal-operating thresholds in an echo suppressor and for establishing a preassigned relation between those thresholds and the return-loss of the system in which the echo suppressor is operated.

The principles of the invention, together with additional objects and features thereof, will be fully apprehended by reference to the following detailed description of an illustrative embodiment together with the appended drawings in which.

Figure 1:
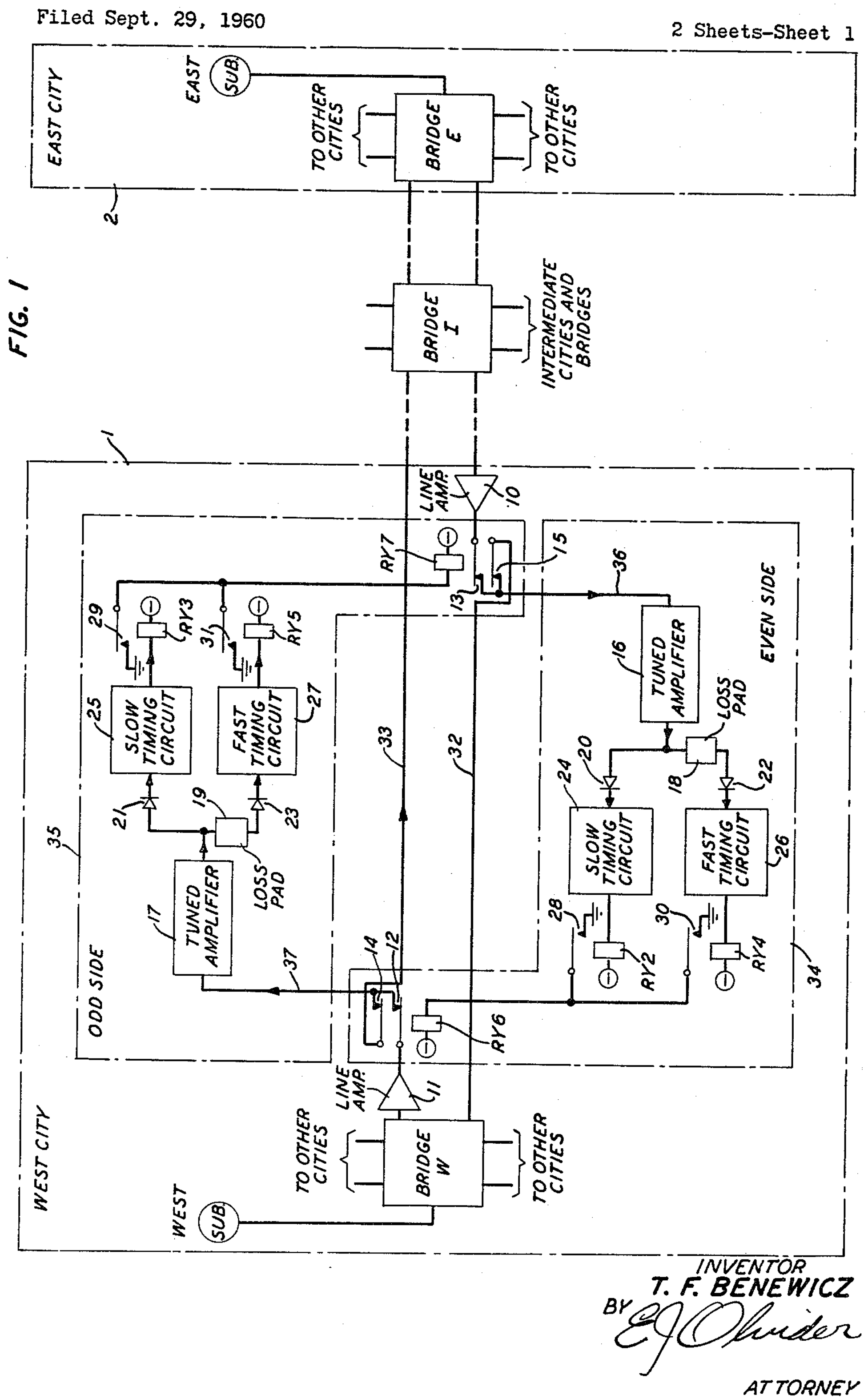
FIG. 1 is a schematic block diagram of a two-way communciation system employing an echo suppressor in accordance with the invention.

The communication system in FIG. 1 interconnects a subscriber in a WEST city 1 to a subscriber in an EAST city 2. Equipment in the WEST city 2 includes a four-wire bridge network W which also serves as a hub-point for regional networks (not shown) of other cities. Additionally equipment is the WEST city includes an echo suppressor comprising two identical networks, namely, an ODD side 35 and an EVEN side 34, a line amplifier 11 serving the WEST to EAST transmission path 33 and a line amplifier 10 serving the EAST to WEST transmission path 32. Equipment in the EAST city, which may be hundreds or even thousands of miles distant from the WEST city, includes a bridge network E serving a function comparable to the bridge network W. The bridge network I is intended to be illustrative of various intermediate hub-points and regional connections between the two cities.

Although for illustrative purposes the system shown in FIG. 1 includes only a single echo suppressor, the suppressor in the WEST city 1, actual systems of this type would typically include a suppressor at each bridge or hub-point. The principles of the invention may readily be demonstrated, however, by a single echo suppressor.

As shown, the echo suppressor is in the unoperated or quiescent condition which is to say that neither of the line relays RY6 or RY7 is energized. Consequently, a closed path is provided for the transmission of signals in both directions, and, additionally, a branch path 36 on the EVEN side 34 and a branch path 37 on the ODD side 35 are provided for diverting signal energy from each side of the system to the respective echo-suppressor networks by way of the break contacts 12 and 13 of line relays RY6 and RY7, respectively.

The structure, function and operation of the echo suppressor may best be understood by following the path of a representative signal. For illustrative purposes, it is assumed that the system shown is a part of a telephoto network designed for the transmission of an amplitude-modulated carrier. The typical carrier wave in such a system is in the audio band, 1300–2500 kc., and consequently positive protection must be provided to eliminate the possibility of interference by voice signals that may be impressed on the line by crosstalk. A WEST to EAST signal is applied to the line amplifier 11 by way of the bridge W. The bridge W is of conventional design and may, for example, take the form of two balanced hybrids arranged in a back-to-back relation. The function of the line amplifier 11 is to boost the level of valid signals to ensure sufficient signal amplitude at the receiving end of the system. The output of amplifier 11 follows a path to the EAST subscriber that includes break contacts 12 and 14 of relay RY6, lead 33, and bridge networks I and E. A part of the signal energy follows an alternate path from break contact 12 of relay RY6 to the input of the tuned amplifier 17 by way of lead 37. Amplifier 17 is not sharply tuned but instead is designed to pass signals varying somewhat in frequency in order to accommodate carrier signals from those subscriber oscillators that drift from the assigned carrier frequency.

The output level of the tuned amplifier 17 is of particular significance in that, in accordance with the invention, it is one of the controlling factors in the ultimate operation of line relay RY7. For the purpose of defining various levels of signal amplitude some reference level must be employed. Such a reference level is arbitrarily defined herein as the amplitude of the strongest signal occurring at the output of amplifier 17 during normal operation. The reference level defined, although somewhat inexact, is fully adequate for the purpose of this disclosure, as evidenced by the following discussion. Consider, then, the sequence of actions initiated by a signal output from the tuned amplified 17 that is below the reference level by 25 db (−25 db), for example. The signal is applied directly to rectifier 21 and is applied by way of loss pad 19 to rectifier 23. In accordance with the invention, the loss introducted by the pad 19 is selected to reduce the amplitude of a signal by approximately one-half the normal signal operating range of the echo suppressor, the range being defined by the reference level and the level of the least signal amplitude to which the echo suppressor is responsive. Thus, for example, if the lowest signal level to which the echo suppressor responds is −40 db, which is determined by the common operating threshold of the slow timing circuit 25 and the fast timing circuit 27, the pad 19 is designed, in accordance with the invention, to introduce a loss of 20 db. The level of the rectified signal applied to the input of the slow timing circuit 25 is therefore −25 db, the same as the output level of the tuned amplifier 17 and the rectified input to fast timing circuit 27 is −45 db which is below the minimum operating threshold. Consequently, only the slow timing circuit 25 is made operative.

The timing circuits 25 and 27 perform a dual function by establishing an operating threshold, as noted, and by delaying the application of a signal above that threshold to their corresponding relays RY3 and RY5. The detailed design and operation of these circuits is described below herein in connection with the discussion of FIG. 2. In the instant example, only timing circuit 25 operates and the delay introduced is relatively long, typically on the order of 4 seconds. The corresponding delay introduced by timing circuit 27, when operated, may be on the order of 2 seconds. Speech signals coupled into the system by crosstalk may occasionally be passed by amplifier 17, because of its relatively broad tuning. Consequently, relatively long delay periods are employed to provide additional protection against false operation by such signals. Inasmuch as speech signals are typically characterized by relatively short bursts of energy, they are in effect blocked by the relatively long time delays of the timing circuits 25 and 27.

After the 4 second delay period, ground potential is applied to relay RY3 by slow timing circuit 25 and the resulting operation of relay RY3 applies ground potential to line relay RY7 by way of make contact 29. The operation of relay RY7 opens break contacts 13 and 15, thereby disabling the EAST to WEST transmission path 32 and also the EVEN side 34 of the echo suppressor. Transmission from WEST to EAST may therefore proceed without interruption from the EAST subscriber and without interference from echoes. In the event of initial transmission from the EAST, the units of the EVEN side 34 of the suppressor, namely amplifier 16, loss pad 18, rectifiers 20 and 22, timing circuits 24 and 26, and relays RY2, RY4, and RY6, function in the same fashion as the corresponding units of the ODD side 35, described above. In the illustrative example described, it is apparent that complete echo protection against echoes results from the operation of relay RY7. Additionally, however, the features of the invention afford similar protection before the operation of relay RY7, that is, during the delay period introduced by slow timing circuit 25 or fast timing circuit 27. Consider, for example, the effect of an echo caused by a reflection of the −25 db WEST to EAST signal from the bridge network E, which may result from a temporary imbalance in the hybrids. As noted above, it is a feature of the invention that the designed operating range of the echo suppressor, 40 db, for example, is selected to be not more than twice as great as the return-loss in the system. Even though return-loss in a communication system of the type described is typically on the order of 40 db, we may assume a loss as low as 20 db and still provide adequate protection. In the case of the −25 db signal, for example, the returning echo is reduced to the −45 db level which is below the maximum sensitivity threshold (−40 db) of the system and the echo side of the suppressor, in this instance the EVEN side 34, cannot be operated.

Figure 3:
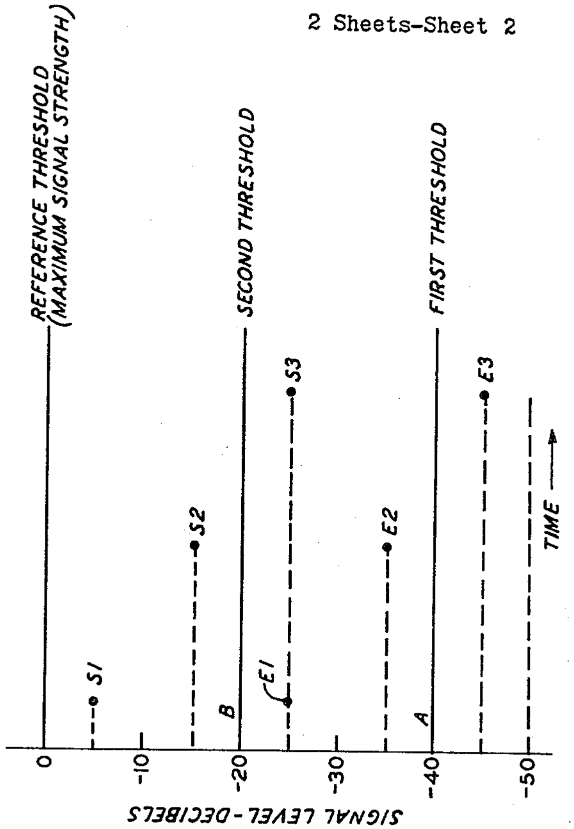
FIG. 3 is a plot of illustrative echo-suppressor thresholds together with the level indications of various signals and their corresponding echoes.

Further discussion of how the system deals with signals and their corresponding echoes at various levels may best be presented with reference to FIG. 3. The axis of ordinates of FIG. 3 is a decibel scale with the origin at the REFERENCE THRESHOLD. The −20 db level, termed the SECOND THRESHOLD, marks the signal strength required to operate either of the fast timing circuits 26 or 27 inasmuch as a signal of lesser magnitude is reduced below the maximum sensitivity level of −40 db, termed the FIRST THRESHOLD, by the loss introduced by the pads 18 or 19. The axis of abcissas in FIG. 3 is an arbitrary time scale and is without significance insofar as showing any time difference between a signal and its corresponding echo. Time difference is employed instead merely as a convenience in distinguishing between various signals.

Consider now the case of the signal S1 that is 5 db down from the REFERENCE THRESHOLD on the output side of tuned amplifier 16 (FIG. 1). Although a signal at this level is obviously of sufficient magnitude to operate the slow timing circuit 24, its magnitude after reduction by the 20 db loss of the pad 18 is −25 db which is sufficient to operate the fast timing circuit 26. Thus, after a relatively short time delay, 2 seconds for example, relay RY4 is operated which in turn results in the operation of line relay RY6. During the time delay period, however, it is possible that the −5 db signal applied to the EAST to WEST path 32 may result in an echo on the WEST to EAST path 33. With a return loss of 20 db or more, the echo E1 which might appear at the output of tuned amplifier 17 would have a maximum level of −25 db, as shown, and, because of the additional 20 db loss introduced by the pad 19, only the slow timing circuit 25 could be operated by the echo. Relays RY4 and RY6 operate, however, before the termination of the relatively long delay period of timing circuit 25 with the end result that the signal necessarily prevails over its echo by disabling the WEST to EAST path for the duration of the EAST to WEST transmission. In similar fashion, the protection against echoes afforded by the features of the invention may readily be traced with reference to a signal at the −15 db level, such as S2, and to a signal at the −25 db level such as S3. Corresponding echoes are designated E2 and E3, respectively. Throughout the foregoing discussion, specific magnitudes of operating thresholds and signal levels have been employed. These magnitudes are merely illustrative, however, and it is apparent that an echo suppressor in accordance with the invention is operative over a wide range of operating thresholds and signal levels.

Figure 2:
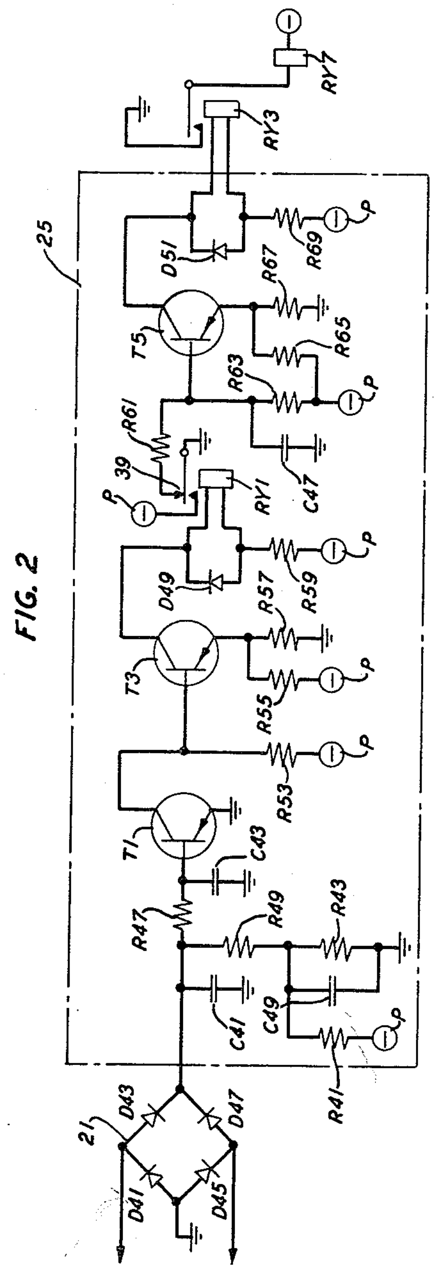
FIG. 2 is a schematic circuit diagram of one of the timing circuits shown in block form in FIG. 1.

FIG. 2 shows a detailed schematic circuit diagram of one of the rectifier, timing-circuit combinations shown in FIG. 1, specifically, rectifier 21 and timing circuit 25. With the exception of the resistance and capacitance values of certain circuit devices, the timing circuit of FIG. 2 is also illustrative of each of the timing circuits 24, 26, and 27. The rectifier 21 is a conventional full-wave bridge comprising diodes D41, D43, D45, and D47. The timing circuit proper comprises three transistor stages comprising transistors T1, T3, and T5, respectively, together with associated circuit components. Each of the three transistors T1, T3, and T5 operates, in effect, as a D.-C. switch although each serves a somewhat different function. Transistor T1 establishes an initial operating threshold for the circuit and, when switched ON, provides D.-C. amplification. Transistor T3, in cooperation with relay RY1, provides additional amplification and also provides an extra measure of isolation between the signal level and the timing function. Transistor T5 is an output stage that couples the timing circuit to relay RY3.

The interrelation of the timing circuit stages may best be explained by tracing the path of an illustrative signal. Ripples which may occur in the D.-C. output of rectifier 21 are filtered by the action of capacitors C41 and C43 and resistor R47. Transistor T1 is normally biased ON by a negative potential fixed by the combination of bias source P, and resistors R41, R43, R49, and R47. Capacitor C49 provides filtering for bias source P. A signal which exceeds the designated threshold of transistor T1, for example, above −40 db, is sufficient to overcome the negative bias on the base, turning transistor T1 OFF. The resulting potential on the collector of transistor T1 is coupled to the base of transistor T3 turning transistor T3 ON. Transistor T3 is in the OFF condition in the absence of a signal by virtue of the reverse bias across the base-emitter junction established by the bias source P in combination with resistors R53, R55, and R57.

When transistor T3 is turned ON, collector current flows through the winding of relay RY1 and resistor R59 to the source P. Diode 49 protects transistor T3 from the relatively high current surge which results when transistor T3 switches to the OFF condition. With the operation of relay RY1, ground is removed from the base of transistor T5 by the opening of break contact 39. Resistor R61 limits current flow and consequently protects contact 39 against arcing. At this point a negative potential on the base of transistor T5 builds up through the action of the potential source P in combination with an RC timing circuit comprising resistor R63 and capacitor C47. Emitter bias on transistor T5, fixed by the voltage divider comprising R65 and R67, is established at a level which ensures turning transistor T5 ON at a preselected time after capacitor C47 starts to charge.

The turning ON of transistor T5, which marks the termination of the circuit time-delay period, results in the flow of collector current through the winding of relay RY3, through resistor R69 and thence to the potential source P. Diode D51 serves the same function in relation to transistor T5 as diode D49 in relation to transistor T3. The operation of relay RY3 applies ground to relay RY7, disabling the EAST to WEST path and the EVEN side of the echo suppressor as explained above in reference to FIG. 1.

The particular embodiment described herein is merely illustrative of the principles of the invention. It will be apparent to persons skilled in the art that a wide variety of implementing means may be employed without departing from the spirit and scope of the invention.

What is claimed is:

1. A two-way communication network comprising, in combination, a path for the transmission of signals in a first direction, a path for the transmission of signals in a second direction, each of said paths including respective first means and respective second means responsive after first and second preassigned time delays, respectively, to signals exceeding first and second preassigned thresholds, respectively, for disabling the other one of said paths and the other ones of said first and second means, said first time delay exceeding said second time delay and said second threshold exceeding said first threshold, either of said paths and the included ones of said first and second means remaining in a disabled condition so long as said signals effecting said disabled condition persist at a level of amplitude exceeding said first threshold irrespective of the amplitude of signals applied to the disabled one of said paths during said disabled condition.

2. A two-way communication network comprising, in combination, a path for the transmission of signals in a first direction, a path for the transmission of signals in a second direction, each of said paths including respective first means and respective second means responsive after first and second preassigned time delays, respectively, to signals exceeding first and second preassigned thresholds, respectively, for disabling the other one of said paths and the other ones of said first and second means, said first time delay exceeding said second time delay and said second threshold exceeding said first threshold, either of said paths and the included ones of said first and second means remaining in a disabled condition so long as said signals effecting said disabled condition persist at a level of amplitude exceeding said first threshold irrespective of the amplitude of signals applied to the disabled one of said paths during said disabled condition, said network having return-loss which exceeds both the difference between said first and second thresholds and the difference between said second threshold and the maximum signal level for which said network is designed.

3. In combination, two signal transmission paths, a respective switching network connected to each of said paths, each of said switching networks comprising a first and a second circuit in parallel relation, each of said first circuits comprising means responsive after a first preassigned time delay to signals exceeding a first preassigned threshold for disabling the other one of said paths and the other one of said networks, each of said second circuits comprising means responsive after a second preassigned time delay to signals exceeding a second preassigned threshold for disabling the other one of said paths and the other one of said networks, said first time delay exceeding said second time delay and said second threshold exceeding said first threshold, either of said paths and the associated one of said networks remaining in a disabled condition so long as said signals effecting said disabled condition persist at a level of amplitude exceeding said first threshold irrespective of the amplitude of signals applied to the disabled one of said paths during said disabled condition.

4. Apparatus in accordance with claim 3 wherein each of said networks includes a respective signal amplifier.

5. Apparatus in accordance with claim 3 wherein each of said circuits includes a respective rectifier.

6. Apparatus in accordance with claim 3 wherein each of said disabling means includes a respective timing circuit and a respective relay.

7. A two-way signaling system comprising, in combination, a four-wire circuit including two oppositely directed one-way paths for signals transmitted in opposite directions; a pair of switching networks; means for applying signals form each of said paths to a respective one of said networks; each of said networks including means for amplifying said signals, means for applying said amplified signals to a pair of parallel circuits, one of said parallel circuits including means for delaying amplified ones of said signals, which exceed a first preassigned threshold, for a first preselected period, the other of said parallel circuits including means for delaying amplified ones of said signals, which exceed a second preassigned threshold, for a second preselected period, means responsive to amplified ones of said signals, as delayed by either of said delaying means, for disabling one of said applying means and the associated one of said paths; the duration of said first period exceeding the duration of said second period and said second threshold exceeding said first threshold; either of said paths and the associated one of said applying means remaining in a disabled condition so long as said signals effecting said disabled condition persist at a level of amplitude which exceeds said first threshold, irrespective of the amplitude of signals applied to the disabled one of said paths during said disabled condition.

8. A two-way signaling system comprising, in combination, two oppositely directed one-way paths for signals transmitted in opposite directions; a pair of switching networks; first means for applying signals from one of said paths to a respective one of said networks; second means for applying signals from the other one of said paths to the other one of said networks; one of said networks including a first relay operatively responsive after a first preassigned time delay to signals applied to said one of said networks which exceed a first preassigned threshold and a second relay operatively responsive after a second preassigned time delay to signals applied to said one of said networks which exceed a second preassigned threshold; the other of said networks including a third relay operatively responsive after said first preassigned time delay to signals applied to said other of said networks which exceed said first preassigned threshold and a fourth relay operatively responsive after said second preassigned time delay to signals applied to said other of said networks which exceed said second preassigned threshold; a fifth relay responsive to the operation of either said first relay or said second relay for disabling said one of said paths and for disabling said first signal-applying means; and a sixth relay responsive to the operation of either said third or said fourth relay for disabling said other one of said paths and for disabling said second signal-applying means.

9. Apparatus in accordance with claim 8 wherein each of said networks further includes means for amplifying said signals applied to each of said networks.

10. Apparatus in accordance with claim 9 wherein each of said networks further includes respective means for rectifying said signals, as amplified, before application to respective ones of said relays and time-delay means for applying the output of each of said rectifying means to a corresponding one of said relays.

References Cited in the file of this patent

UNITED STATES PATENTS

| | | |
|---|---|---|
| 2,183,389 | Bjornson | Jan. 14, 1939 |
| 2,209,667 | Taylor | July 30, 1940 |
| 2,212,960 | Schott | Aug. 27, 1940 |
| 2,977,510 | Adamson | Mar. 28, 1961 |